US008380600B1

(12) United States Patent
Blum

(10) Patent No.: US 8,380,600 B1
(45) Date of Patent: Feb. 19, 2013

(54) SYSTEM, METHOD AND COMPUTER PROGRAM PRODUCT FOR A PRODUCT CATALOG/PRICING ENGINE FRAMEWORK

(75) Inventor: Michael Blum, Somers, NY (US)

(73) Assignee: Amdocs Software Systems Limited, Dublin (IE)

( * ) Notice: Subject to any disclaimer, the term of this patent is extended or adjusted under 35 U.S.C. 154(b) by 1204 days.

(21) Appl. No.: 11/447,755

(22) Filed: Jun. 5, 2006

(51) Int. Cl.
*G06Q 40/00* (2012.01)

(52) U.S. Cl. ............... 705/36 R; 705/26; 705/26.81; 705/27; 705/35; 705/37; 705/40; 705/400; 703/20; 395/602

(58) Field of Classification Search ............ 705/26, 705/26.81, 27, 35, 37, 40, 400; 703/20; 395/602
See application file for complete search history.

(56) References Cited

U.S. PATENT DOCUMENTS

| | | | | | |
|---|---|---|---|---|---|
| 5,319,542 | A | * | 6/1994 | King et al. | 705/26.81 |
| 5,706,495 | A | * | 1/1998 | Chadha et al. | 395/602 |
| 2001/0037296 | A1 | * | 11/2001 | Ganesan et al. | 705/40 |
| 2002/0059131 | A1 | * | 5/2002 | Goodwin et al. | 705/37 |
| 2005/0125310 | A1 | * | 6/2005 | Hazi et al. | 705/27 |
| 2006/0178864 | A1 | * | 8/2006 | Khanijo et al. | 703/20 |
| 2006/0277134 | A1 | * | 12/2006 | Glinberg et al. | 705/35 |
| 2006/0293965 | A1 | * | 12/2006 | Burton | 705/26 |
| 2007/0130090 | A1 | * | 6/2007 | Staib et al. | 705/400 |

OTHER PUBLICATIONS

IBM, "From banks to banking II, The journey has begun", IBM Business Consulting Services, May 2004, ibm.com/bcs.
IBM, "Component business modeling: A private banking example", IBM Business Consulting Services, 2004, ibm.com/bcs.

\* cited by examiner

*Primary Examiner* — James Trammell
*Assistant Examiner* — Sanjeev Malhotra
(74) *Attorney, Agent, or Firm* — Zilka-Kotab, PC

(57) ABSTRACT

A system, method and computer program product are provided including a catalog database with a plurality of product definitions. The product definitions includes a plurality of rules and attributes associated with a plurality of products. Further included is a pricing engine in communication with the catalog database. The pricing engine is adapted for charging for the products based on the rules and the attributes.

16 Claims, 11 Drawing Sheets

SYSTEM, METHOD AND COMPUTER PROGRAM PRODUCT FOR A PRODUCT CATALOG/PRICING ENGINE FRAMEWORK

BACKGROUND AND FIELD OF THE INVENTION

The present invention relates to commerce, and more particularly to e-commerce.

SUMMARY

A system, method and computer program product are provided including a product catalog database with a plurality of product definitions. The product definitions include a plurality of rules and attributes associated with a plurality of products (e.g. financial products, etc.). Further included is a pricing engine in communication with the catalog database. The pricing engine is adapted for charging for the products based on the rules and the attributes associated with each product.

DETAILED DESCRIPTION

Figure 1:
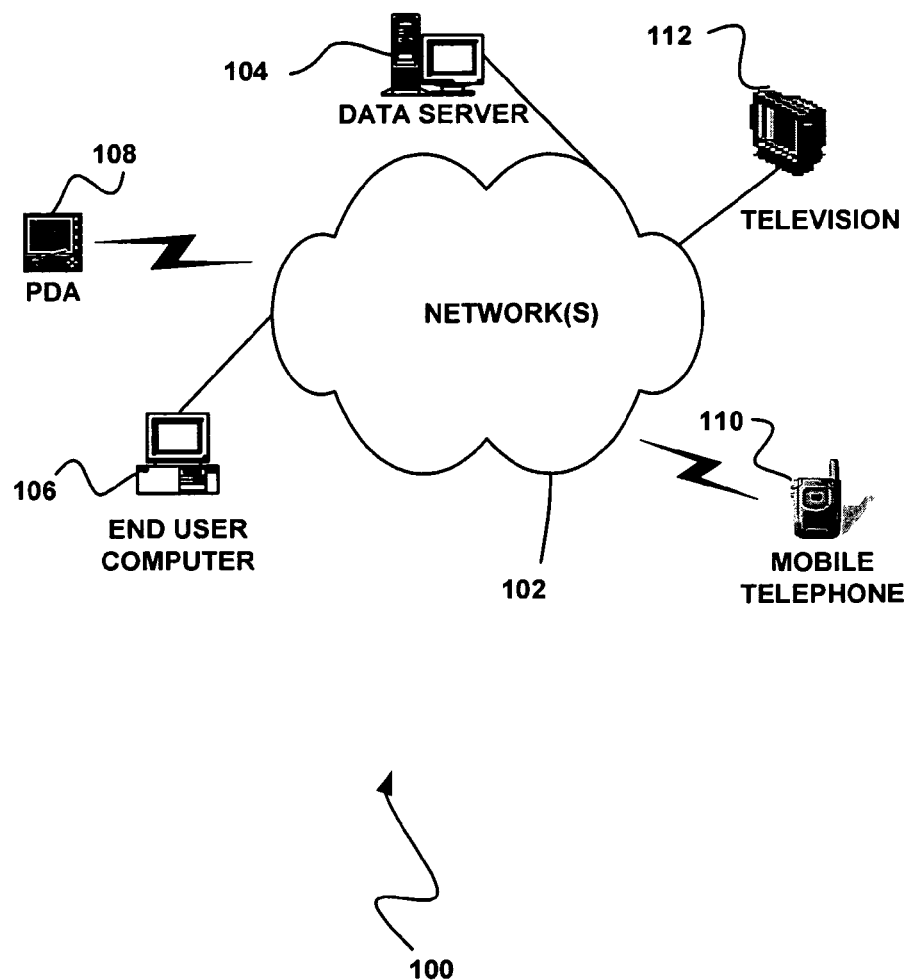
FIG. 1 illustrates a network architecture, in accordance with one embodiment.

FIG. 1 illustrates a network architecture 100, in accordance with one embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

It should be noted that any of the foregoing devices in the present network architecture 100, as well as any other unillustrated hardware and/or software, may be equipped with the capability of making various products available to users of other devices, etc. More information regarding such capability will be set forth hereinafter in greater detail during reference to subsequent figures.

Figure 2:
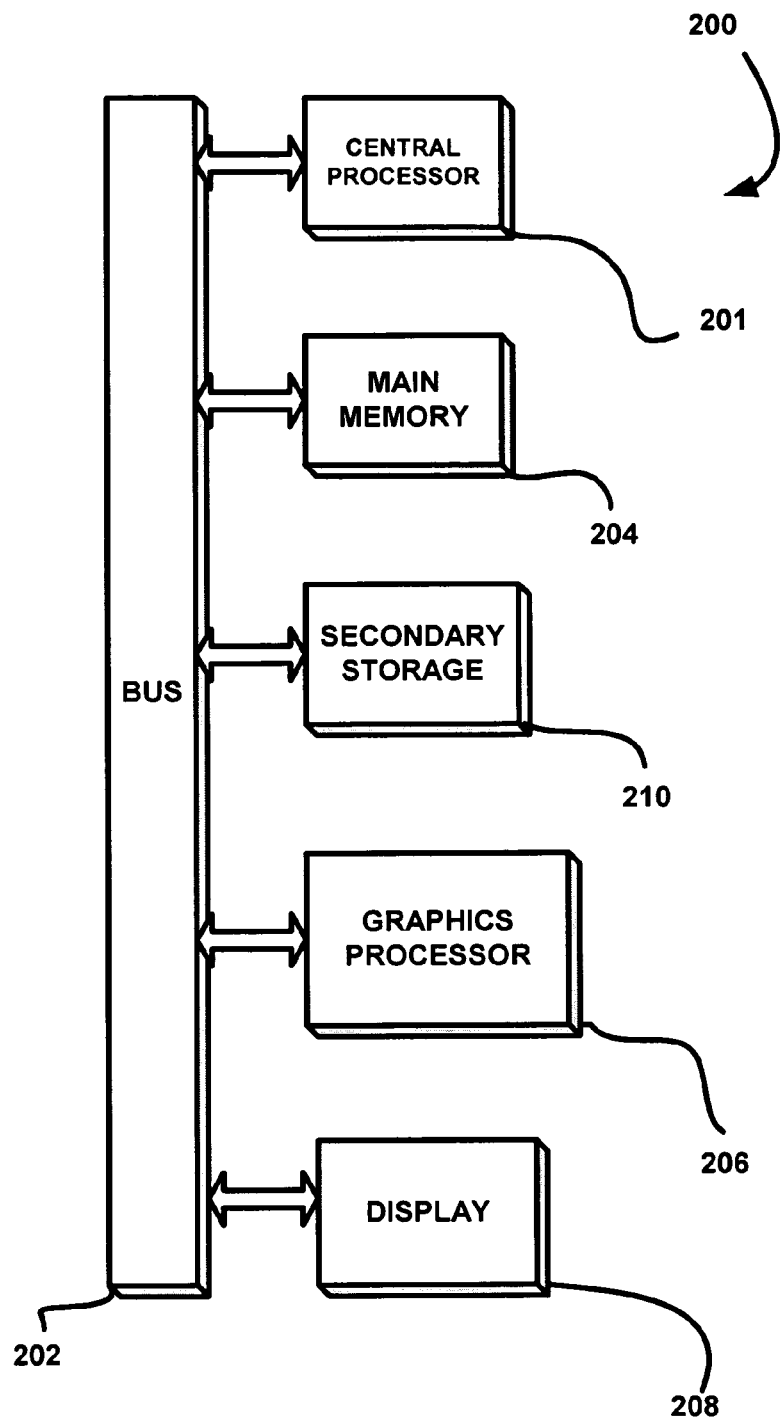
FIG. 2 illustrates an exemplary computer system, in accordance with one embodiment.

FIG. 2 illustrates an exemplary computer system 200, in accordance with one embodiment. As an option, the computer system 200 may be implemented in the context of any of the devices of the network architecture 100 of FIG. 1. Of course, the computer system 200 may be implemented in any desired environment.

As shown, a computer system 200 is provided including at least one central processor 201 which is connected to a communication bus 202. The computer system 200 also includes main memory 204 [e.g. random access memory (RAM), etc.]. The computer system 200 also includes a graphics processor 206 and a display 208.

The computer system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the computer system 600 to perform various functions. Memory 204, storage 210 and/or any other storage are possible examples of computer-readable media.

Figure 3:
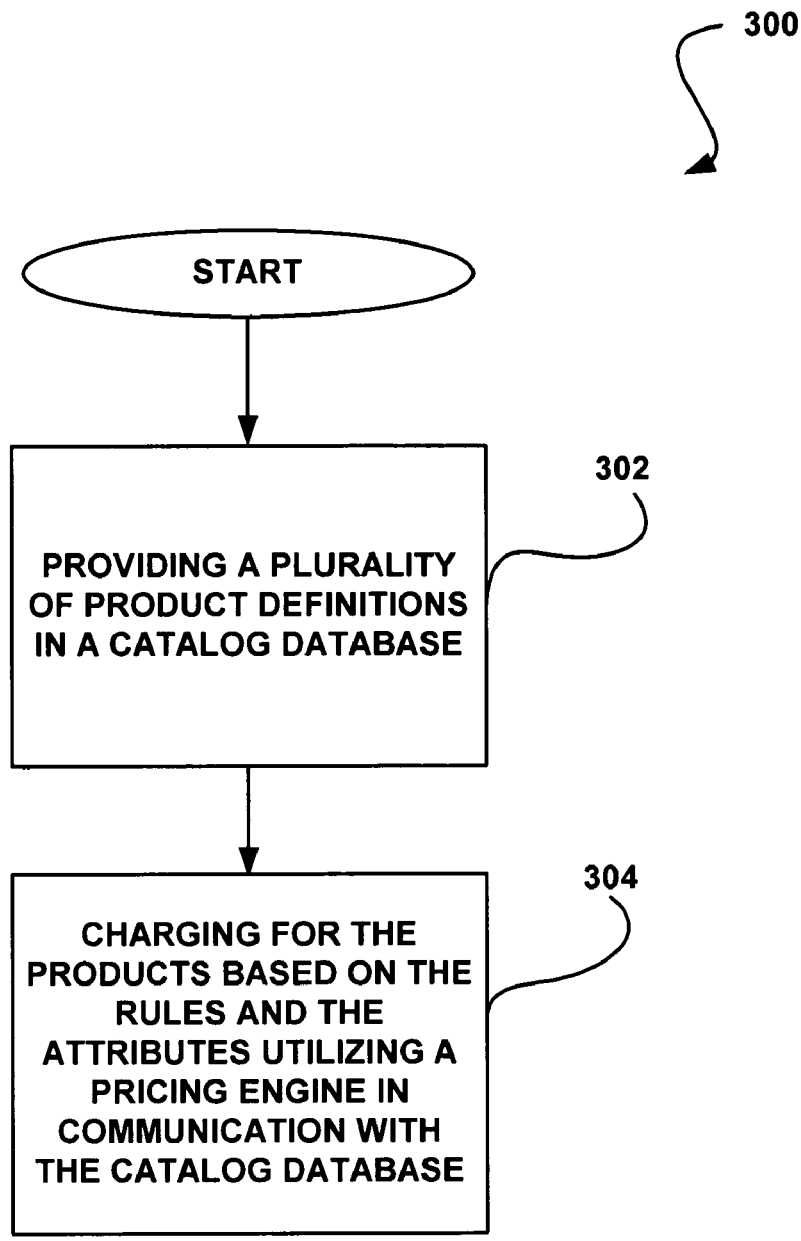
FIG. 3 shows a method for providing a catalog of products, in accordance with one embodiment.

FIG. 3 shows a method 300 for providing a catalog of products, in accordance with one embodiment. As an option, the method 300 may be implemented in the context of the details of FIGS. 1 and/or 2. Of course, however, the method 300 may be carried out in any desired environment. Further, the aforementioned definitions may equally apply to the description below.

As shown, a plurality of product definitions and rules is provided in a catalog database. See operation 302. The product definitions include a plurality of rules and attributes associated with a plurality of products. In the context of the present description, the rules may include any logic capable of processing various input to generate output in association with at least one related product. Further, the attributes may include any parameter that is capable of being assigned a value, trait, etc. for use in association with the aforementioned input and/or output.

As an option, the products may include financial products. For example, the financial products may include, but are not limited to a loan, an account, securities, and/or a mortgage. Of course, however, it should be noted that any product which is capable of being provided (e.g. for sale, etc.) may be cataloged. It should also be noted that, in the context of the present description, the term product is deemed to be inclusive of services as well.

In one optional embodiment, access to the products may be provided over a network. As will be set forth later in greater detail, this may be accomplished utilizing a variety of optional graphical user interfaces. Still yet, the products may be bundled. In such embodiment, the rules of the bundled product may be interdependent. For example, at least a portion of the rules of a first product may operate as a function of at least a portion of the rules of a second product, and visa-versa etc. More information relating to such embodiments will be set forth in greater detail during reference to subsequent figures.

In still other embodiments which take on a component-based approach, a plurality of components may be pre-defined to include a plurality of the rules, etc. Such components may, for example, take the form of software objects that incorporate the rules. To this end, the product definitions may each include a plurality of the components (which, in turn, includes the different rules, etc.). Thus, the components (and therefore the rules, etc.) may be capable of being re-used in conjunction with a plurality of the products. Again, more information relating to such embodiment will be set forth in greater detail during reference to subsequent figures.

As shown in operation 304, the system charges for the products based on the rules and the attributes, utilizing a pricing engine that remains in communication with the catalog database. Of course, the pricing engine may include any hardware and/or software capable of the functionality set forth in operation 304.

To this end, the aforementioned product database and the pricing engine may be used to conveniently provide and charge for various products. In some embodiments, such system may interface an existing banking system, so that such banking system may provide the catalog of products to its customers.

More illustrative information will now be set forth regarding various optional architectures and uses in which the foregoing method 300 may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
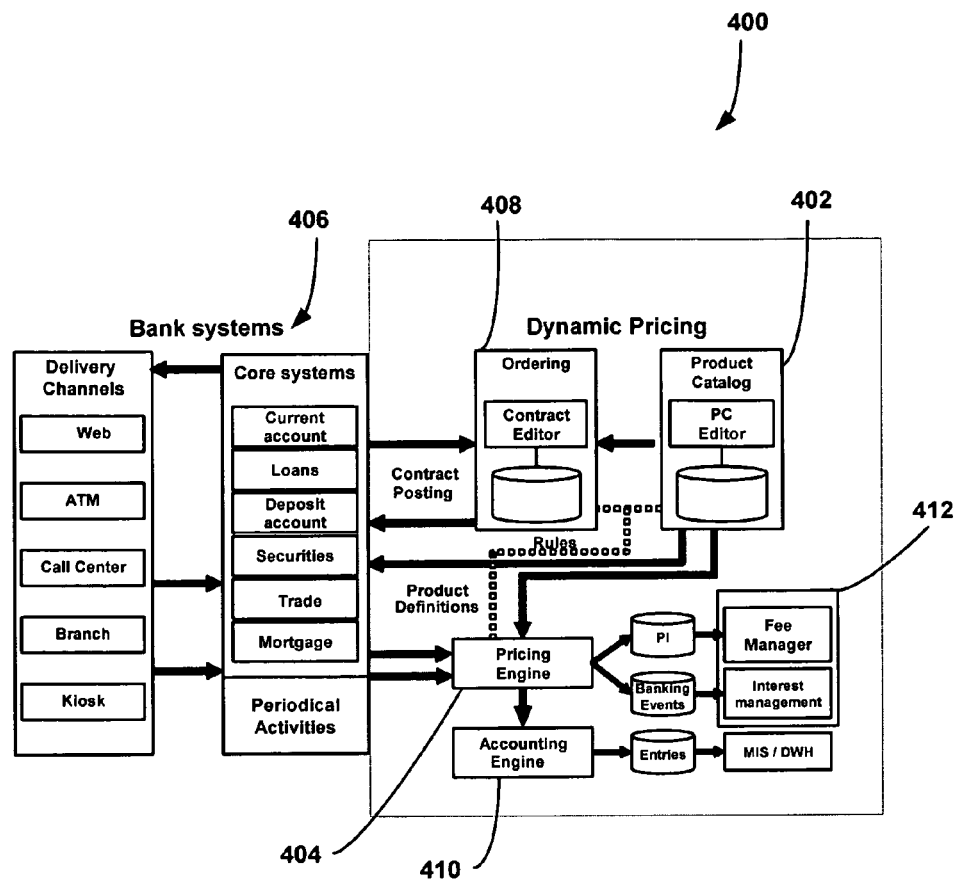
FIG. 4 shows a system for providing access to and charging for various products, in accordance with another embodiment.

FIG. 4 shows a system 400 for providing access to and charging for various products, in accordance with another embodiment. As an option, the system 400 may be implemented in the context of the details of FIGS. 1-3. Of course, however, the system 400 may be carried out in any desired environment. Again, the aforementioned definitions may equally apply to the description below.

As mentioned earlier, the system 400 may interface with one or more existing banking systems 406. Such banking systems 406 may include a plurality of core systems providing a plurality of financial products (e.g. accounts, loans, securities, mortgages, etc.), in the manner shown. Still yet, access to such products may be provided by one or more delivery channels (e.g. Web, ATM, call center, branch, kiosk, etc.).

For providing more flexible, dynamic control as to the financial products that are provided, the aforementioned core systems of the banking systems 406 may interface with the system 400. As shown, the system 400 includes a product catalog 402 that includes a database similar to that set forth above during the description of FIG. 3. As mentioned previously, the database of the product catalog 402 includes product definitions associated with a plurality of products and which each have a plurality of rules and attributes. The product catalog 402 further stores information regarding the bundling of any products (along with the interdependent rules, etc.).

In the context of financial products stored by the product catalog 402, it should be noted that financial-specific rules may include pricing information as well as complete product terms and conditions including, but not limited to eligibility and fulfillment rules, interest calculations, etc. As an option, such rules and/or attributes may be edited utilizing the illustrated product catalog editor. This may be accomplished utilizing a plurality of graphical user interfaces, examples of which will be set forth hereinafter in greater detail.

Table 1 illustrates exemplary rules and attributes (with exemplary values shown) associated with possible product definitions.

TABLE 1

| 1. Standard Rate Schemes - Fund transfer |
| --- |
| Linear rating scheme - |
| $0.80/fund transfer - |
| Step rating scheme - |
| $0.8/fund transfer - first 2 transfers |
| $0.6/fund transfer - 2 additional transfers |
| $0.4/each additional transfers (above 4) |
| Tier rating scheme - |
| $0.4/all fund transfers (from 1st) when going over 6 transfers |
| 2. Cross-product pricing |
| Get 5% discount on bonds management fee when checking account average monthly balance is above $1,000 |
| Earn value points with value of 5% of average saving account balance, for a monthly balance exceeding $4,000 |

Of course, such examples are set forth for illustrative purposes and should not be construed as limiting in any manner. In other embodiments, high level rules may be provided which dictate rules that manage multiple products. For example, a rule may exist that requires a first product (e.g. checking account, etc.) to already be in place before another product (e.g. securities account, etc.) is made available.

Further provided is an order engine 408 in communication with the product catalog 402. In use, the order engine 408 is capable of offering a bundle of the products by communicating the same to the banking systems 406 which, in turn, expose them via the various delivery channels. Still yet, the order engine 408 is capable of receiving acceptances of such offers and thereby forming contracts (and other associated documentation) which are stored in a database, as shown.

As an option, the various rules and/or attributes associated with the product definitions (and associated products) may be tweaked on a customer-by-customer basis. In other embodiments, default rules and/or attributes may be used in situations where such tailoring is either not available or not requested. Thus, the rules, etc. are communicated between the product catalog 402 and the order engine 408, in the manner shown. To this end, the order engine 408 handles the ordering process including, but not limited to opening accounts, delivering contracts of products and/or bundles, managing negotiations, managing internal document distribution and tracking contracts to completion.

Also included is a pricing engine 404 that remains in communication with the product catalog 402. In the one embodiment, the pricing engine 404 is independent of the product catalog 402. As set forth earlier during reference to FIG. 3, the pricing engine 404 may serve to charge for the products based on the rules and the attributes. To this end, pricing engine 404 is capable performing necessary calculations for all instances of banking products and/or bundles thereof. For example, financial calculations may be provided for quotes on banks offers, fee calculation, loans installment, interest, accruals, etc. In situations where such financial calculations are to be externally provided, the pricing engine 404 may communicate the same to the banking systems 406 which, in turn, expose them via the various delivery channels.

To accomplish this, the pricing engine 404 is capable of using pricing rules as defined in the product catalog 402. Note that the rules, etc. are communicated between the product catalog 402 and the pricing engine 404. As an option, real time-quotation may be provided, as well as mass assets re-evaluation.

With continuing reference to FIG. 4, an accounting engine 410 is provided which remains in communication with the pricing engine 408. Such accounting engine 410 identifies events and related pricing information from an output of the pricing engine 408. To this end, the accounting engine assembles entries utilizing such output. The accounting engine 410 may further be adapted to update balances utilizing the entries, and even report on the balances.

As an option, the foregoing capabilities may be provided in a real-time fashion. Further, the accounting engine 410 may provide a real-time interrelated view on all balance and off-balance items. Still yet, the accounting engine 410 may enable standardization in financial accounting, etc. across different lines of business and silo applications.

In various embodiments, additional system components may be provided, in the manner shown in FIG. 4. For example, a fee manager 412 may be included to enable the banking systems 406 to manage fees and commissions for banking products and/or bundles.

By this structure, product bundling may be provided for banking customers which may possibly provide increased revenue. Revenue growth may also be provided by preventing revenue leakage through a control of fee benefits given to customers across multiple products and bundles. Still yet, segmented and personalized services may be offered and delivered. Even still, time-to-market for new products may be reduced by using a predefined library of product definitions.

Figure 5:
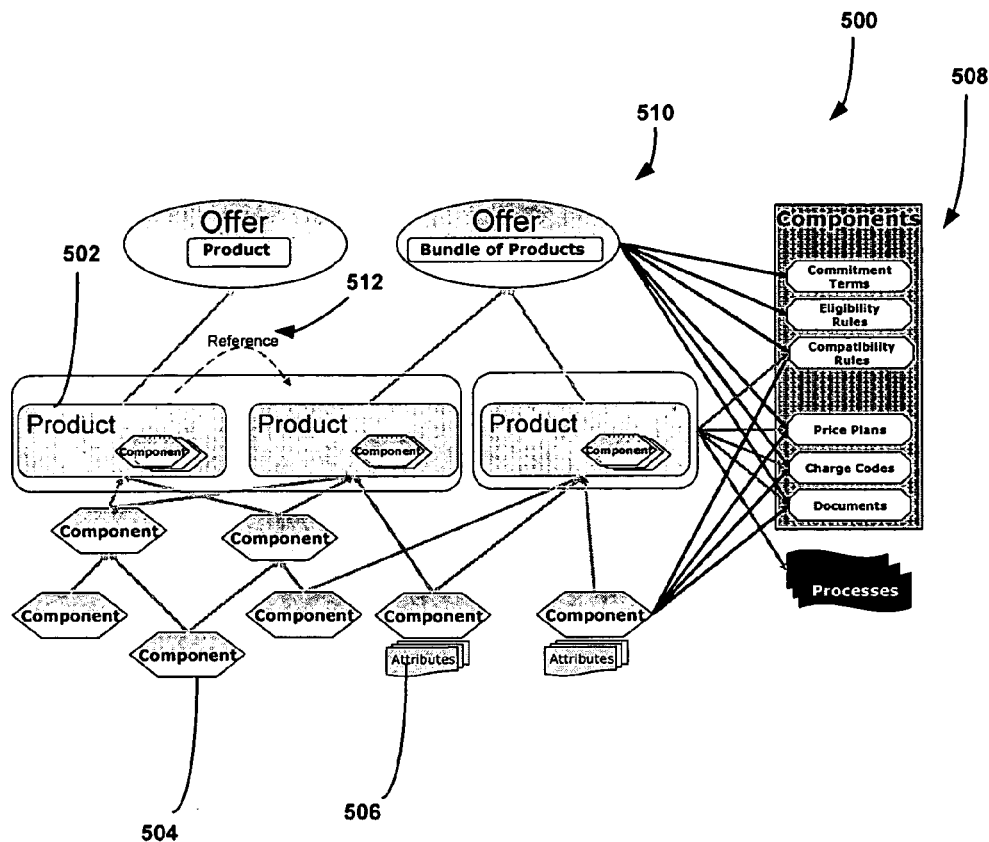
FIG. 5 shows a framework for defining products using components, in accordance with another embodiment.

FIG. 5 shows a framework 500 for defining products using components, in accordance with another embodiment. As an option, the framework 500 may be implemented in the context of the details of FIGS. 1-4. Of course, however, the framework 500 may be carried out in any desired environment. Again, the aforementioned definitions may equally apply to the description below.

As mentioned earlier, the various products provided by the aforementioned systems and methods may be built using components. As shown in FIG. 5, each product 502 is composed of a plurality of components 504. Such components 504, in turn, represents a unique collection of rules 508 (e.g. commitment terms, eligibility rules, compatibility rules, price plans, charge codes, documents, processes, etc.) and attributes 506.

To this end, the components 504 may be defined and reused across different products 502. Similarly, the products 502 may be reused in the form of bundles, in the manner shown. As further shown, the components, rules, etc. of the bundled products may reference 512 each other and thus be interdependent. This multiple-tier framework 500 thus allows for product offerings 510 to be highly configurable without necessarily having to build each product from start.

With the foregoing systems and methods established, more information will now be set forth regarding various interfaces that may (or may not) be used to access and/or provide the aforementioned related functionality. Of course, such examples are set forth for illustrative purposes only and should not be construed as limiting in any manner.

Figure 6:
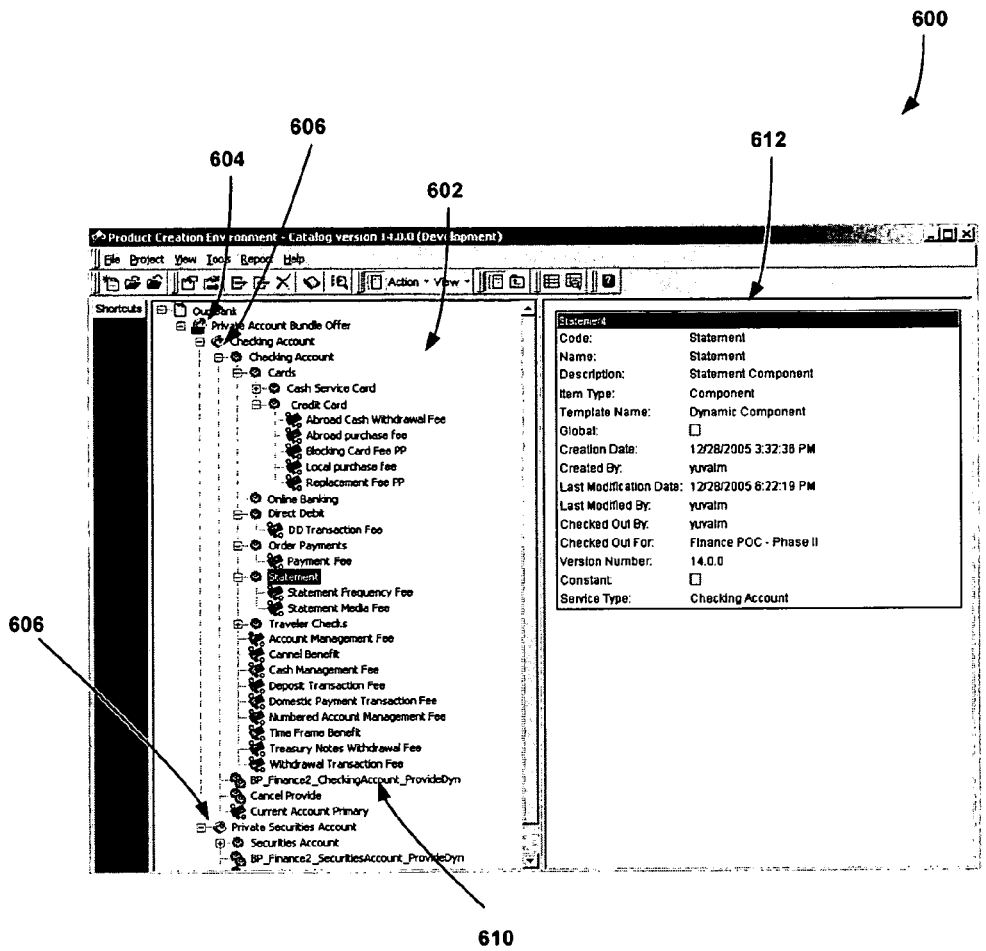
FIG. 6 illustrates a graphical user interface for defining products and related bundles, in accordance with another embodiment.

FIG. 6 illustrates a graphical user interface 600 for defining products and related bundles, in accordance with another embodiment. As shown, a window 602 is provided for displaying a bundle 604, bundled products 606, components and related rules/attributes 610, etc. As shown, both the bundle 604, products 606, components, rules/attributes 610 may be collapsed for convenient viewing. Further, by selecting the same, such entities may be edited in another window 612. As shown, upon selection of a statement (which may be part of a component, etc.), such statement may be edited in the window 612.

Figure 6A:
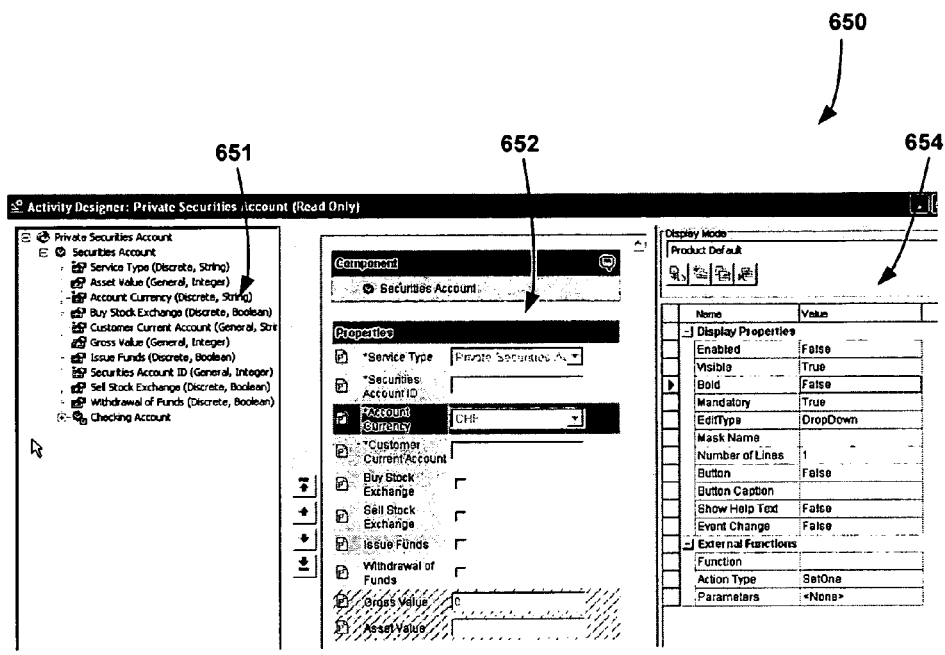
FIG. 6A illustrates another graphical user interface for defining products, related bundles of products, and components thereof, in accordance with another embodiment.

FIG. 6A illustrates another graphical user interface 650 for defining products, related bundles, and components thereof, in accordance with another embodiment. As shown, various tools may be used to edit different aspects of a particular component 651. A first interface 652 is provided with pull down menus, etc. for editing different functional properties of the component 651. Further, another interface 654 is provided for managing display properties.

Figure 6B:
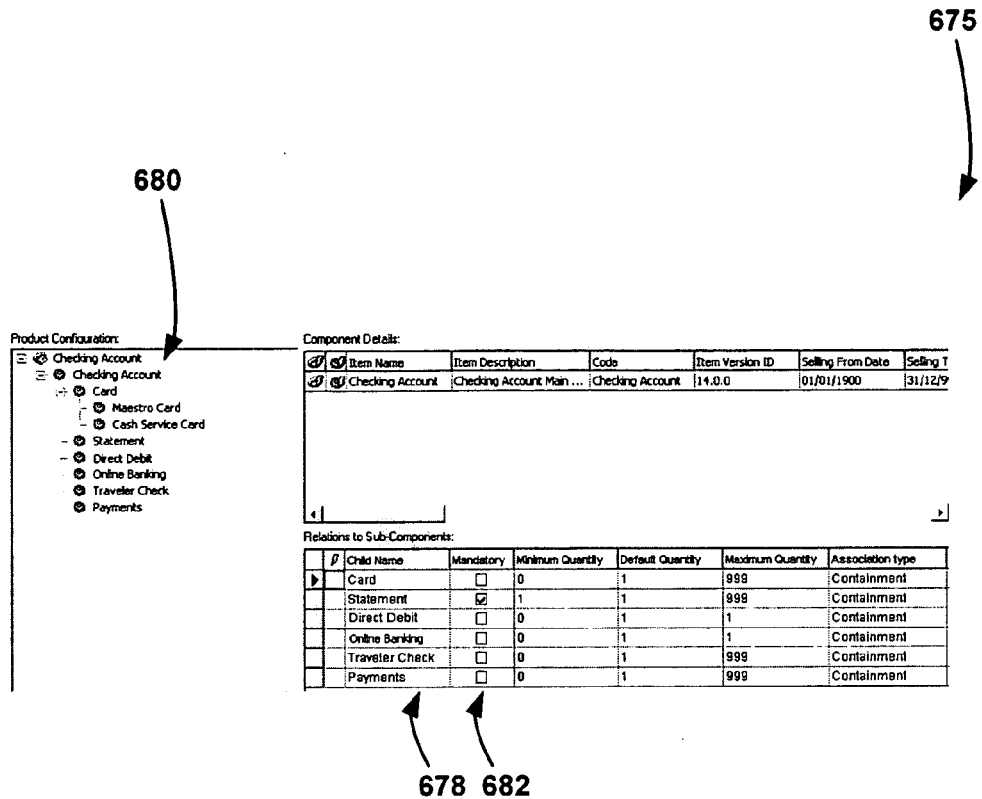
FIG. 6B illustrates yet another graphical user interface for defining products, related bundles, and components thereof, in accordance with another embodiment.

FIG. 6B illustrates yet another graphical user interface 675 for defining products, related bundles, and components thereof, in accordance with another embodiment. As shown, a particular window 678 is provided for allowing a particular selected component 680 to be linked to (or reference) other components (e.g. sub-components, etc.). This may be accomplished utilizing a plurality of check boxes 682, in the manner shown.

With the various products, related bundles, and components thereof defined using the graphical user interfaces of FIGS. 6-6B, other interfaces may be used during product offering, negotiation, tailoring, etc. More information will now be set forth regarding such interfaces.

Figure 7:
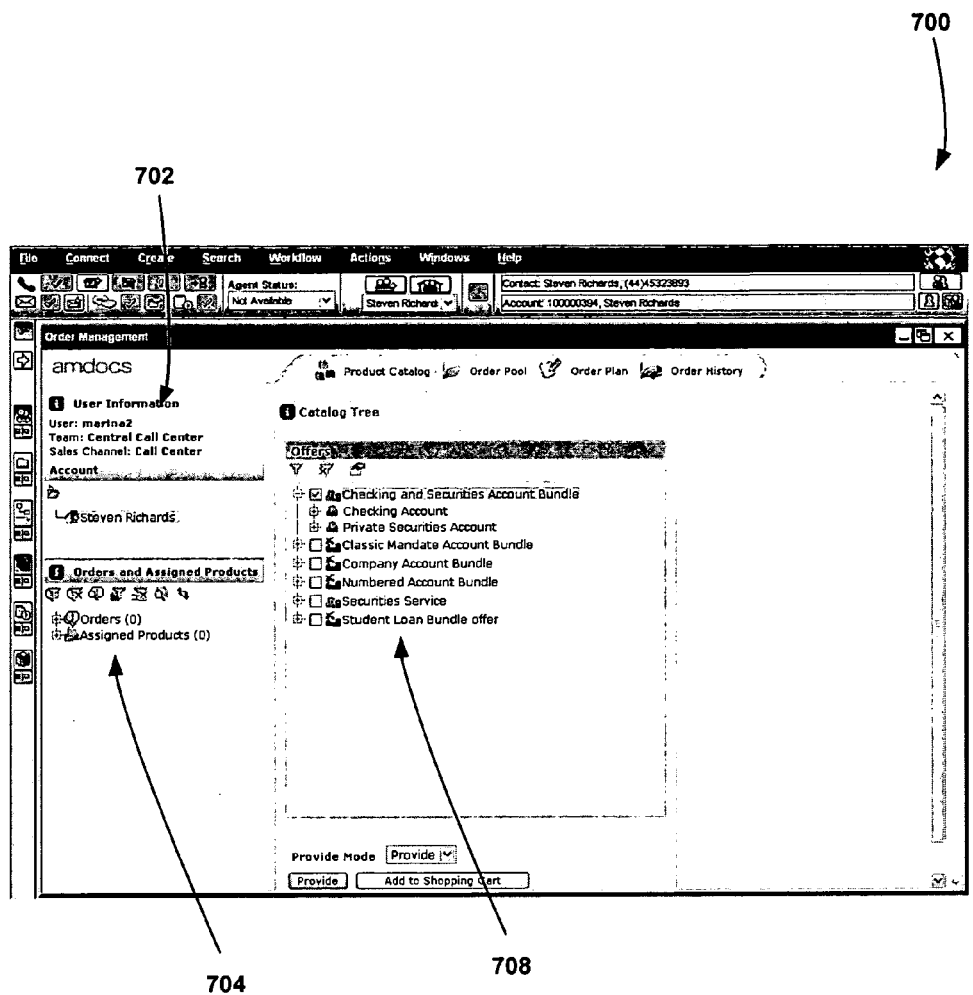
FIG. 7 illustrates a graphical user interface for entering a product contract with respect to customers, in accordance with another embodiment.

FIG. 7 illustrates a graphical user interface 700 for entering a product contract with respect to customers, in accordance with another embodiment. As shown, an identity of a call center administrator may be reflected in a first window 702. Further, a particular customer account may also be reflected in a second window 704 along with a summary of products and bundles thereof. Still yet, another window 708 may be provided with a tree-based organization of different products and product bundles.

In use, the administrator, while communicating with the particular customer, may select the various products/bundles to be associated with the customer, utilizing the window 708. As an option, the different selected products may further be tailored utilizing an additional interface that will now be described.

Figure 7A:
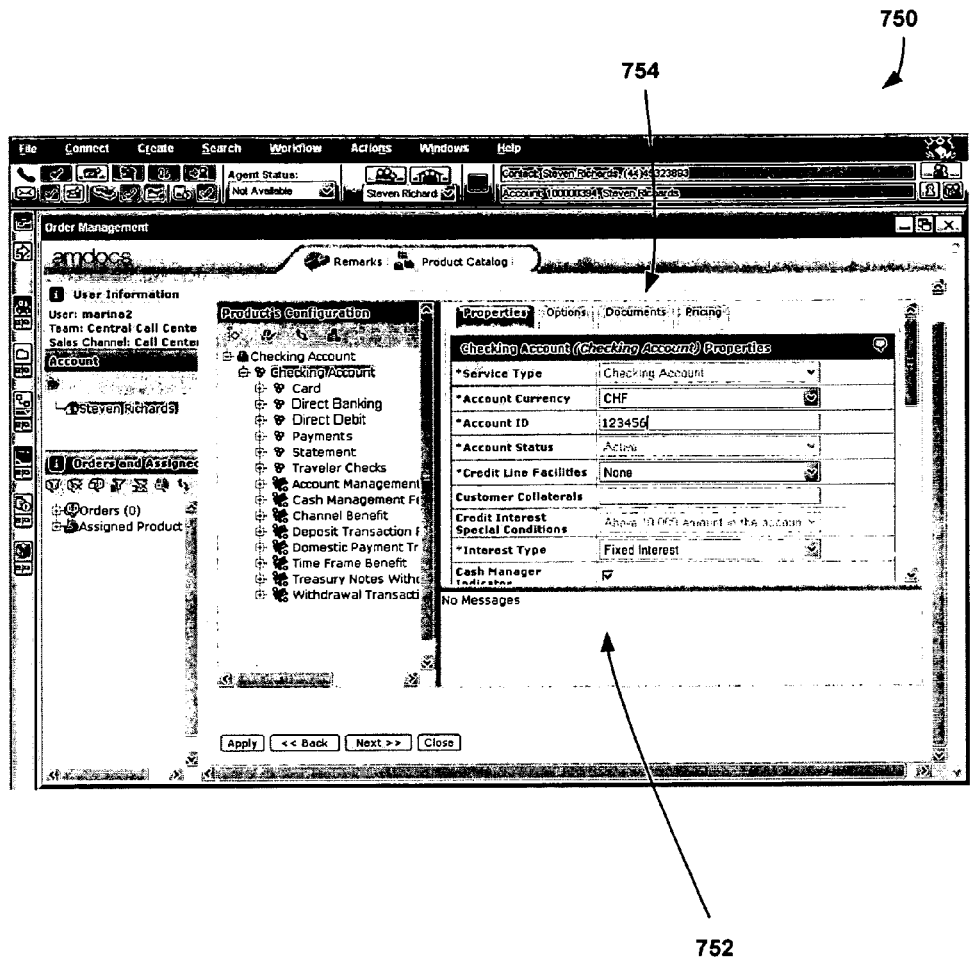
FIG. 7A illustrates a graphical user interface for entering a product contract with respect to customers and, in particular, tailoring a particular product, in accordance with another embodiment.

FIG. 7A illustrates a graphical user interface 750 for entering a product contract with respect to customers and, in particular, tailoring a particular product, in accordance with another embodiment. As illustrated, such interface 750 includes an additional window 752 that is illustrated in response to a selection of a particular product. Such window 752 may allow entry of various values to be associated with different attributes, selection of available rule variations, etc., thereby tailoring the product. As further shown, the window 752 may include different tabs 754 for viewing and altering different properties, options, documents, and pricing. To this end, a product may be tailored, in real-time, while negotiating a related contract with a particular customer.

While not necessarily shown, the various fields in the window 752 may be initially populated with default attribute-related values, rules, etc. Further, the selection of different pull down options may result in a re-population of relevant fields with additional default fields. Again, rules may be used to dictate these relations.

Figure 8:
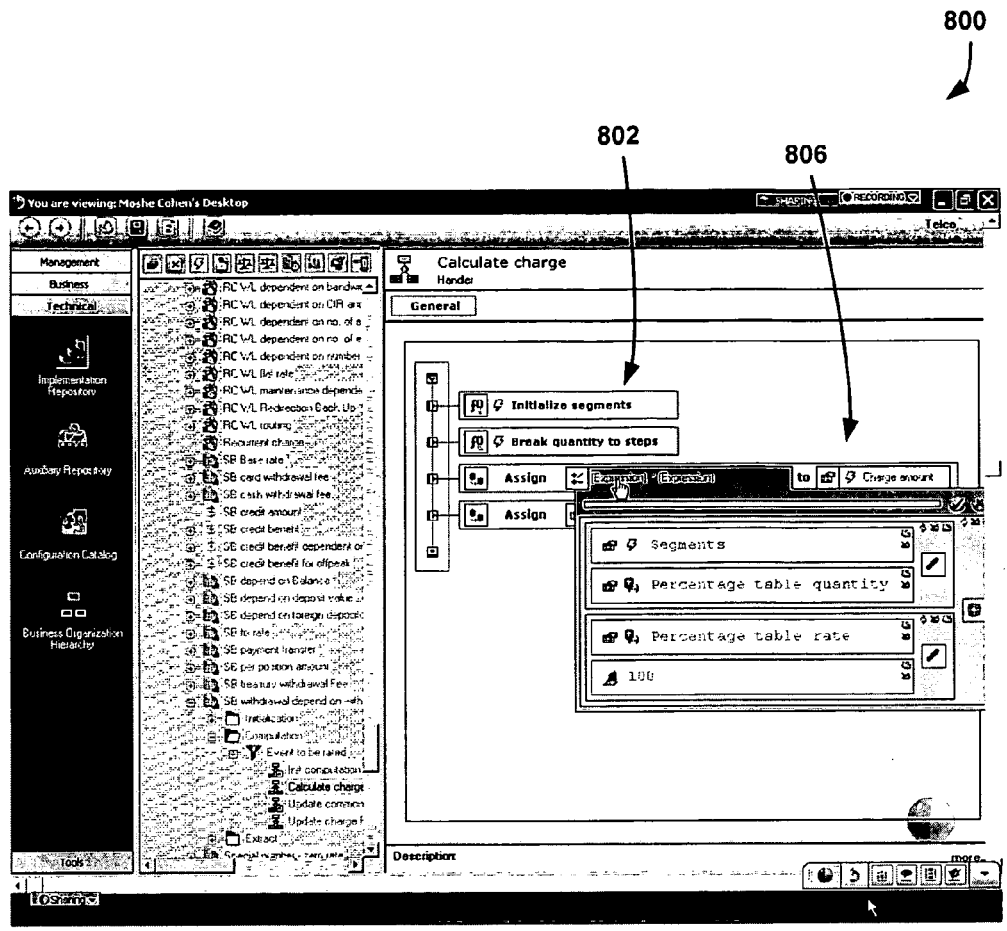
FIG. 8 illustrates a graphical user interface for configuring a pricing engine, in accordance with another embodiment.

FIG. 8 illustrates a graphical user interface 800 for configuring a pricing engine, in accordance with another embodiment. As an option, the interface 800 may be used for configuring a pricing engine like the one set forth during reference to FIG. 4. To accomplish this, the interface 800 may allow the definition of a pricing sequence by arranging icons 802 representative of different pricing operations. Further, formulas relating to different pricing calculations may be configured utilizing a configuration window 806.

By these features, a system and method are provided for efficiently and/or effectively providing dynamically-configured products in the context of financial institutions as well as other organizations, corporations, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
   a catalog database including a plurality of product definitions, the product definitions including a plurality of rules and attributes associated with a plurality of products; and
   a pricing engine in communication with the catalog database, the pricing engine adapted for charging for the products based on the rules and the attributes;
   wherein the products include financial products;
   wherein the catalog database and the pricing engine interface an existing banking system;
   wherein the plurality of the products are bundled;
   wherein the rules of the bundled products are interdependent;
   wherein a plurality of components are pre-defined to include the plurality of rules;
   wherein the system is operable such that upon selection of the plurality of products for a customer utilizing a graphical user interface, the graphical user interface allows for the selection of one or more rule variations for the plurality of products for that customer and also allows for the entry of one or more values to be associated with attributes of the plurality of products for that customer;
   wherein the rules include pricing information, eligibility and fulfillment rules, and interest calculations;
   wherein the system is operable such that the rules are edited using a product catalog editor;
   wherein one of the rules requires a first product to be in place before another product is made available;
   wherein the system is operable such that an order engine in communication with the catalog database receives an order indicating the bundled plurality of products and forms a contract in response to the receipt of the order, where the contract is stored in a database; and
   wherein the rules include commitment terms, eligibility rules, compatibility rules, price plans, charge codes, documents, and processes.

2. The system of claim 1, wherein access to the products is provided over a network.

3. The system of claim 1, wherein the product definitions each include the plurality of the components.

4. The system of claim 1, wherein the components are capable of being re-used in conjunction with the plurality of the products.

5. The system of claim 1, wherein the financial products are selected from the group consisting of a loan, an account, securities, and a mortgage.

6. The system of claim 1, and further comprising an order engine in communication with the catalog database.

7. The system of claim 6, wherein the order engine is capable of offering a bundle of the plurality of the products.

8. The system of claim 1, and further comprising an accounting engine in communication with the pricing engine.

9. The system of claim 8, wherein the accounting engine identifies events and related pricing information from an output of the pricing engine.

10. The system of claim 9, wherein the accounting engine assembles entries utilizing the output of the pricing engine.

11. The system of claim 10, wherein the accounting engine updates balances utilizing the entries.

12. The system of claim 11, wherein the accounting engine reports on the balances.

13. The system of claim 1, wherein at least one of the catalog database and the pricing engine is configurable.

14. The system of claim 1, wherein the plurality of rules of the bundled products are interdependent such that at least a portion of rules of a first product operate as a function of at least a portion of rules of a second product, and at least another portion of rules of the second product operate as a function of at least another portion of rules of the first product.

15. A computer program product embodied on a non-transitory computer readable medium, comprising:
   computer code for storing a plurality of product definitions in a catalog database, the product definitions including a plurality of rules and attributes associated with a plurality of products; and
   computer code for charging for the products based on the rules and the attributes, utilizing a pricing engine in communication with the catalog database;
   wherein the products include financial products;
   wherein the catalog database and the pricing engine interface an existing banking system
   wherein the computer program product is operable such that the plurality of the products are bundled;
   wherein the computer program product is operable such that the rules of the bundled products are interdependent;
   wherein the computer program product is operable such that a plurality of components are pre-defined to include the plurality of the rules;
   wherein the computer program product is operable such that upon selection of the plurality of products for a customer utilizing a graphical user interface, the graphical user interface allows for the selection of one or more rule variations for the plurality of products for that customer and also allows for the entry of one or more values to be associated with attributes of the plurality of products for that customer;
   wherein the rules include pricing information, eligibility and fulfillment rules, and interest calculations;
   wherein the computer program product is operable such that the rules are edited using a product catalog editor;
   wherein one of the rules requires a first product to be in place before another product is made available;
   wherein the computer program product is operable such that an order engine in communication with the catalog database receives an order indicating the bundled plurality of products and forms a contract in response to the receipt of the order, where the contract is stored in a database; and wherein the rules include commitment terms, eligibility rules, compatibility rules, price plans, charge codes, documents, and processes.

16. A method, comprising:

storing a plurality of product definitions in a catalog database, the product definitions including a plurality of rules and attributes associated with a plurality of products; and charging for the products based on the rules and the attributes utilizing a pricing engine in communication with the catalog database;

wherein the products include financial products;

wherein the catalog database and the pricing engine interface an existing banking system wherein the plurality of the products are bundled;

wherein the rules of the bundled products are interdependent;

wherein a plurality of components are pre-defined to include the plurality of the rules;

wherein upon selection of the plurality of products for a customer utilizing a graphical user interface, the graphical user interface allows for the selection of one or more rule variations for the plurality of products for that customer and also allows for the entry of one or more values to be associated with attributes of the plurality of products for that customer;

wherein the rules include pricing information, eligibility and fulfillment rules, and interest calculations;

wherein the rules are edited using a product catalog editor;

wherein one of the rules requires a first product to be in place before another product is made available;

wherein an order engine in communication with the catalog database receives an order indicating the bundled plurality of products and forms a contract in response to the receipt of the order, where the contract is stored in a database; and wherein the rules include commitment terms, eligibility rules, compatibility rules, price plans, charge codes, documents, and processes.

* * * * *